United States Patent
Shimizu et al.

(10) Patent No.: US 7,580,641 B2
(45) Date of Patent: Aug. 25, 2009

(54) REPEATER AND OPTICAL COMMUNICATION SYSTEM

(75) Inventors: Hiroshi Shimizu, Musashino (JP); Katsuya Ikezawa, Musashino (JP); Akira Toyama, Musashino (JP); Yasukazu Akasaka, Musashino (JP); Kanji Tatsumi, Musashino (JP); Chie Sato, Musashino (JP); Hirotoshi Kodaka, Musashino (JP); Tadashige Fujita, Musashino (JP); Tsuyoshi Yakihara, Musashino (JP); Daisuke Hayashi, Musashino (JP); Masayuki Suehiro, Musashino (JP); Shinji Iio, Musashino (JP); Morio Wada, Musashino (JP); Akira Miura, Musashino (JP)

(73) Assignee: Yokogawa Electric Corporation (JP)

( * ) Notice: Subject to any disclaimer, the term of this patent is extended or adjusted under 35 U.S.C. 154(b) by 493 days.

(21) Appl. No.: 11/401,851

(22) Filed: Apr. 12, 2006

(65) Prior Publication Data
US 2007/0047956 A1   Mar. 1, 2007

(30) Foreign Application Priority Data
Aug. 30, 2005   (JP) .............................. 2005-248945

(51) Int. Cl.
*H04J 14/08* (2006.01)
(52) U.S. Cl. ..................................................... 398/166
(58) Field of Classification Search ................... 398/166
See application file for complete search history.

(56) References Cited

U.S. PATENT DOCUMENTS 7,133,613 B2 *  11/2006   Shimizu et al. ............... 398/46
2003/0235193 A1 *  12/2003   Hosaka ........................ 370/389

FOREIGN PATENT DOCUMENTS

JP   2003-69495 A   3/2003

* cited by examiner

*Primary Examiner*—Leslie Pascal
(74) *Attorney, Agent, or Firm*—Sughrue Mion, PLLC

(57) ABSTRACT

Disclosed is a repeater including: a recognizing unit to recognize a destination address of an optical packet from the optical packet which includes the destination address assigned in unit of bit and a bit indicating whether or not a plurality of destination addresses are assigned; an optical splitting unit to split the optical packet into a plurality of optical packets; and selecting units to select transmission channels for the split optical packets on the basis of recognition results by the recognizing units, respectively.

6 Claims, 13 Drawing Sheets

REPEATER AND OPTICAL COMMUNICATION SYSTEM

FIELD OF THE INVENTION

The present invention relates to a repeater for relaying optical packets and an optical communication system using the repeater for transmitting optical packets.

DESCRIPTION OF RELATED ART

Optical communication systems using optical signals for data communication have become widely used in recent years. In the optical communication systems, packet communication is performed in a similar way to data communication by using electric signals. (For example, refer to Patent document 1: JP-2003-069495A) In data communication, the packet communication is communication in which data is divided into a plurality of small data blocks which are called packets, and the divided data blocks are sent or received.

An operation for switching the optical packets by a conventional repeater will be described with reference to FIG. 10. In FIG. 10, an optical packet P1 is transmitted through an optical transmission channel 200 (for example, an optical waveguide such as an optical fiber, and the like) to a repeater 201. In the repeater 201, a destination address and source address contained in a header portion of the optical packet P1 are referred, and a transmission channel through which the optical packet is to be transmitted is selected. For instance, the repeater 201 selects an optical transmission channel 205 and outputs an optical packet P2 to the following repeater 203 through the optical transmission channel 205. A repeater which performs destination control, that is, switches a transmission channel is called a network switch.

FIG. 11 is a view showing a configuration of a conventional repeater. Hereinafter, the repeater 201 connected with the optical transmission channels 200, 204 and 205 will be described as an example of a conventional repeater. The repeater 201 comprises optical ports 206, 207 and 208, a packet processing unit 209, and a storing unit 210. The packet processing unit 209 comprises a CPU (Central Processing Unit) and an ASIC (Application Specific Integrated Circuit). The storing unit 210 comprises, for example, an RAM (Random Access Memory) and the like. The optical ports 206, 207 and 208 are connected to the optical transmission channels 200, 204 and 205, respectively. The packet processing unit 209 is connected to the optical ports, and the storing unit 210 is connected to the packet processing unit 209.

The optical port 206 receives the optical packet P1 through the optical transmission channel 200 and converts the optical packet P1 into an electric signal packet, to output the same to the packet processing unit 209. The packet processing unit 209 reads a destination address (and a source address, as need) included in the header portion of the optical packet converted into an electric signal to select an optical port for the destination.

The packet processing unit 209 sometimes transfers the packet to the optical port for the destination after storing the packet in the storing unit 210, or transfers the packet to the optical port without storing the packet in the storing unit 210. In the example shown in FIG. 11, the packet processing unit 209 selects the optical port 208 connected to the optical transmission channel 205, and transfers the electric signal packet to the optical port 208. The optical port 208 converts the electric signal packet into an optical signal packet (optical packet P2) and outputs the optical packet P2 to the optical transmission channel 205. In the manner described above, the optical packet is transferred to the optical transmission channel selected by the repeater.

Referring to FIG. 12, an optical communication system for transferring one optical packet to a plurality of optical transmission channels will be described. It is possible to perform one-to-many communication effectively by reproducing or copying one optical packet and transferring a plurality of optical packets having the same contents to a plurality of optical transmission channels. It is called "Broadcast" to transfer an optical packet to all connected optical transmission channels, and it is called "Multicast" to transfer an optical packet only to the optical transmission channels selected from among the plurality of optical transmission channels. FIG. 12 is a view illustrating a case where the optical packet P1 is duplicated or copied in the repeater 201, and the optical packets P2 and P3 having the same contents are transferred to the optical transmission channels 205 and 204, respectively.

With reference to FIG. 13, an operation in the repeater 201 will be described, which is performed to transfer the optical packet P1 to the optical transmission channels 204 and 205.

The optical packet P1 is transferred through the optical transmission channel 200 to the repeater 201, and converted into an electric signal packet by the optical port 206, and outputs to the packet processing unit 209. In the packet processing unit 209, an optical port for a destination is selected based on a destination address (and a source address, as need) contained in the header portion of the packet converted into an electric signal. The packet converted into an electric signal is stored in the storing unit 210 and then transferred to the optical ports 207 and 208 connected to the optical transmission channels 204 and 205, respectively.

In the optical port 207, the electric signal packet is converted into an optical signal packet (optical packet P3), and the optical packet P3 is output to the optical transmission channel 204. In the optical port 208, the electric signal packet is converted into an optical signal packet (optical packet P2), and the optical packet P2 is output to the optical transmission channel 205. In this way, the optical packet is transferred to a plurality of optical transmission channels by the repeater.

As shown in FIGS. 11 and 13, in the conventional repeater, since the packet processing unit 209 and storing unit 210 processes the packet electrically, it is essential to convert an optical signal into an electric signal and to convert an electric signal into an optical signal. Therefore, there are the following problems.

Since a processing speed of an electric process is considerably low compared with a speed in an optical communication, a processing delay occurs while an optical packet or optical signal is converted into an electric signal of a low speed, and the converted electric signal is processed electrically. Therefore, when the optical packet passes through a plurality of repeaters, a disadvantage is invited, that requires a longer time for the optical packet to pass through a plurality of repeaters, since a processing delay occurs in every repeater.

To avoid the above disadvantage, electric circuits and equipment of a considerably large scale are required, which are capable of performing such electric processes at a processing speed comparable to that of the optical communication. Therefore, it is hard to put these circuit and equipment into practical use. Further, in the broadcast transmission and/or multicast transmission, since a single packet is duplicated into a plurality of packets in the packet processing unit 209, another disadvantage occurs that increases operation load to be applied to the packet processing unit 209.

SUMMARY OF THE INVENTION

An object of the invention is to realize an optical communication with a high speed without increasing a circuit scale of the repeater.

In order to achieve the above-described object, in accordance with a first aspect of the invention, the repeater comprises: a recognizing unit to recognize a destination address of an optical packet from the optical packet which includes the destination address assigned in unit of bit and a bit indicating whether or not a plurality of destination addresses are assigned; an optical splitting unit to split the optical packet into a plurality of optical packets; and selecting units to select transmission channels for the split optical packets on the basis of recognition results by the recognizing units, respectively.

Preferably, in the repeater, a plurality of specified addresses can be designated for each of the optical packets split by including a combination of bits each indicating a destination address and a bit indicating that a plurality of destination addresses are assigned.

In accordance with a second aspect of the invention, the optical communication system comprises a repeater provided in a network, for transferring an optical packet, wherein the repeater comprising: a recognizing unit to recognize a destination address of an optical packet from the optical packet which includes the destination address assigned in unit of bit and a bit indicating whether or not a plurality of destination addresses are assigned; an optical splitting unit to split the optical packet into a plurality of optical packets; and selecting units to select transmission channels for the split optical packets on the basis of recognition results by the recognizing units, respectively Preferably, in the optical communication system, the repeater is provided in a ring type network.

According to the invention, destination addresses are recognized from an optical packet having a simple address configuration, the optical packet is split by splitting means, and the split optical packets are transferred respectively to transmission channels corresponding to the destination addresses, whereby an optical communication is performed at a high speed without electrically processing the optical packet in a repeater nor increasing a circuit scale of the repeater.

BRIEF DESCRIPTION OF THE DRAWINGS

The present invention will be fully understood with reference to the following detailed description and the accompanying drawings. These are only for explanation of the invention, and by no means restrict the scope of the invention, wherein.

DESCRIPTION OF PREFERRED EMBODIMENTS OF THE INVENTION

Now, embodiments of the invention will be described with reference to the accompanying drawings.

[Broadcast]

Using a ring type network as a sample of a communication network, a broadcast transmission in an optical packet network will be described with reference to FIGS. 1 to 3.

Figure 1:
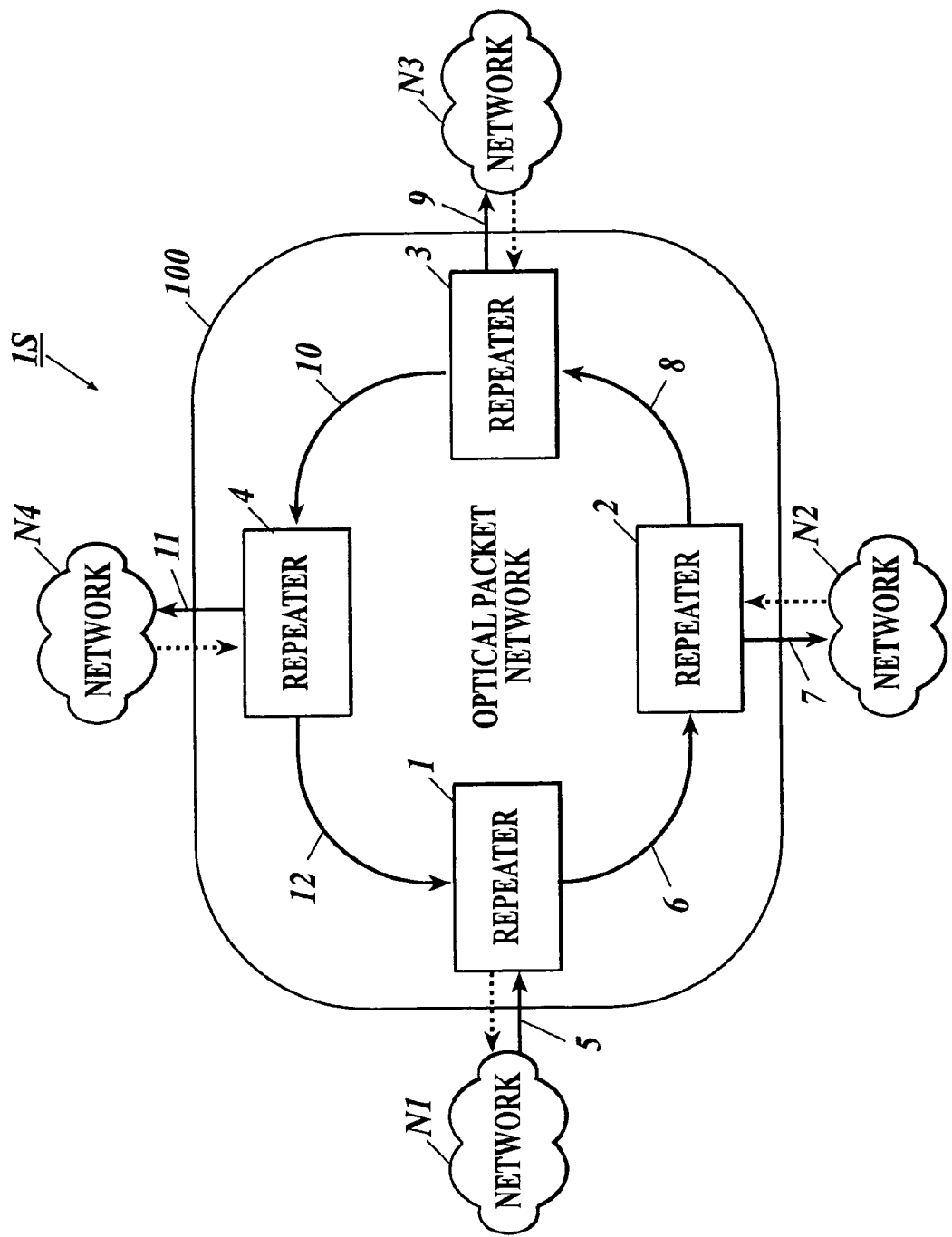
FIG. 1 is a view illustrating a flow of an optical packet in the broadcast transmission.

FIG. 1 is a view illustrating a configuration of an optical communication system 1S according to an embodiment of the invention, and a flow of optical packets (shown by solid arrows) in the broadcast transmission. The optical communication system 1S is provided with a plurality of repeaters 1 to 4 on a ring type network 100 as shown in FIG. 1. The repeaters 1 to 4 are connected with networks N1 to N4, respectively. In FIG. 1, the optical communication system 1S which is provided with four repeaters is illustrated, for simplicity, for describing the embodiment of the invention, but there is no limitation to the number of the repeater.

An optical packet generated in the network N1 is transferred through an optical transmission channel 5 to the repeater 1 and further to the ring type network 100 therefrom. The optical packet runs on an optical transmission channel 6 from the repeater 1 to a repeater 2. Then, the optical packet is duplicated in the repeater 2, and transferred to optical transmission channels 7 and 8. The optical packet transferred to the optical transmission channel 7 reaches the network N2, and meanwhile the optical packet transferred to the optical transmission channel 8 reaches the repeater 3. In the same way, the optical packet is duplicated in the repeater 3 and transferred to optical transmission channels 9 and 10. Further, the optical packet transferred to the optical transmission channel 9 reaches the network N3 and the optical packet transferred to the optical transmission channel 10 reaches the repeater 4. Thereafter, the optical packet is duplicated in the repeater 4 and transferred to the network N4 through an optical transmission channel 11, and also transferred through an optical transmission channel 12 to return to the repeater 1, which serves as a gate to the ring type network 100.

The optical packet which has returned to the repeater 1 serving as the gate to the ring type network 100 is broken off in the repeater 1. If the optical packet is not broken off by the repeater 1, the optical packet goes around the ring type network 100 again, and keeps going around eternally. Therefore, a process of the repeater 1 for breaking off or removing the optical packet is necessary.

Figure 2:
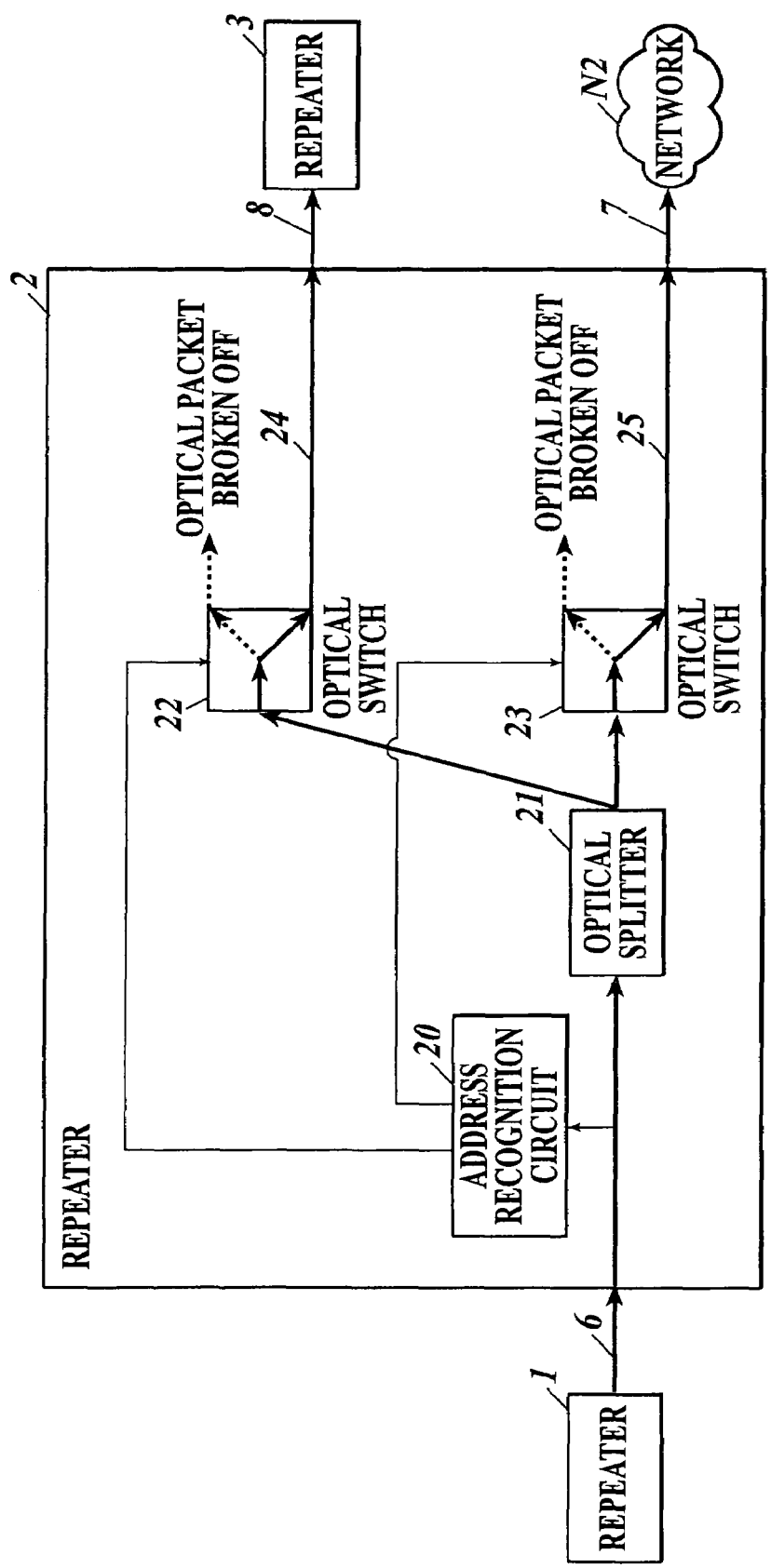
FIG. 2 is a view illustrating an interior configuration of a repeater according to an embodiment of the invention, and a transferring operation of the optical packet from the repeater to a network and further to a following repeater.
Figure 3:
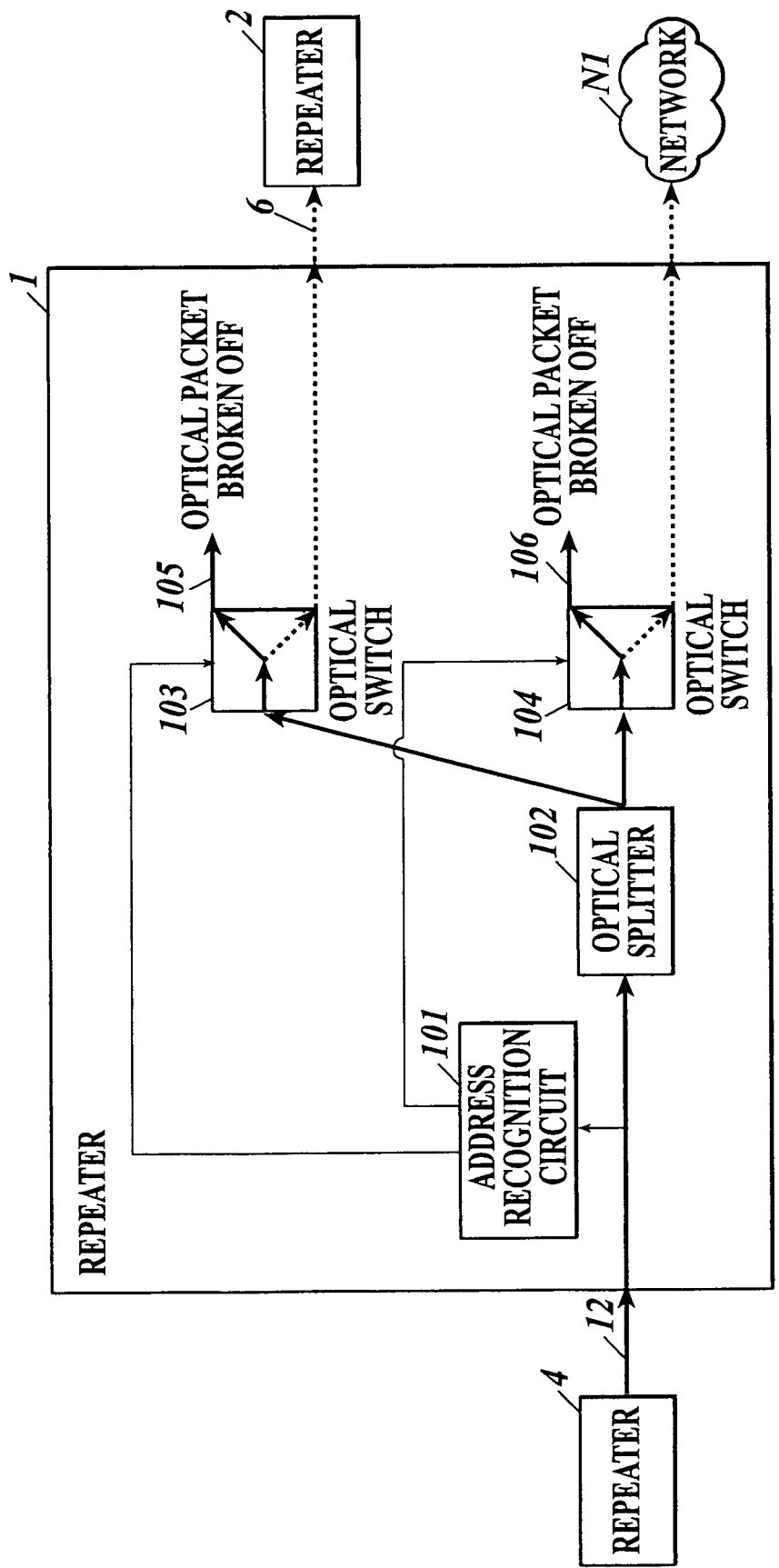
FIG. 3 is a view illustrating an operation for breaking off the optical packet in the repeater according to the embodiment of the invention.

FIG. 2 is a view illustrating an interior configuration of the repeater provided in the optical communication system 1S. The interior configuration of the repeater 2 is shown in FIG. 2, and each repeater provided in the optical communication system 1S has the same configuration. As shown in FIG. 2, the repeater 2 comprises an address recognition circuit 20, optical splitter 21, optical switch 22 and optical switch 23.

The address recognition circuit 20 recognizes a destination address contained in a header portion of the optical packet, and outputs a control signal generated based on the recognition result to the optical switches 22 and 23. The destination address has a bit which indicates whether or not the optical packet is transferred to a plurality of destinations (broadcast transmission, multicast transmission, unicast transmission) (refer to FIG. 5).

The optical splitter 21 splits the received optical packet into a plurality of packets (two packets in FIG. 2) to duplicate a plurality of optical packets having the same contents. Two optical packets duplicated by the optical splitter 21 are output to optical switches 22 and 23, respectively.

The optical switches 22 and 23 select transmission channels for the duplicated optical packets on the basis of the destination addresses recognized by the address recognition circuit 20.

Now, operation will be described, which is performed by the repeater 2 in the broadcast transmission.

When the optical packet is entered to the repeater 2, the address recognition circuit 20 recognizes that the optical packet has been transferred in the broadcast transmission. The address recognition circuit 20 generates a control signal based on the recognition result and outputs the control signal to optical switches 22 and 23. Meanwhile, the optical packet entered to the repeater 2 is split by the optical splitter 21 and output to the optical switches 22 and 23.

In a case of the broadcast transmission, the optical switch 22 selects the optical transmission channel 24, and the optical packet duplicated by the optical splitter 21 is transferred to the optical transmission channel 24. Meanwhile, the optical switch 23 selects the optical transmission channel 25, and the duplicated optical packet is transferred to the optical transmission channel 25. The optical packet transferred to the optical transmission channel 24 reaches the repeater 3 through the optical transmission channel 8. The optical packet transferred to the optical transmission channel 25 reaches the network N2 through the optical transmission channel 7. Operation is performed in the repeaters 3 and 4 in the same manner as in the repeater 2.

As described above, the optical packet in the broadcast transmission passes through the repeaters without being subjected to Optical/Electric conversion, and is transferred to all the plurality of optical transmission channels connected to all the repeaters, respectively.

Now, a removing process performed by the repeater 1 to break off the optical packet will be described with reference to FIG. 3.

The optical packet which returns to the repeater 1 serving as the gate to the ring type network 100 is broken off by the repeater 1, preventing the optical packet from keeping going around the ring type network 100.

The optical packet returns through the optical transmission channel 12 to the repeater 1, and when an address recognition circuit 101 recognizes that the repeater 1 is the gate repeater to the ring type network 100, a control signal generated based on the recognition result is output to optical switches 103 and 104. The optical packet enters to the repeater 1 through the optical transmission channel 12 is split into two packets by the optical splitter 102 and these packets are output to the optical switches 103 and 104, respectively.

The control signal of the address recognition circuit 101 selects an optical transmission channel 105 in the optical switch 103, and the optical packet duplicated by the optical splitter 102 is transferred to the optical transmission channel 105. Meanwhile, an optical transmission channel 106 is selected by the optical switch 104, and the optical packet duplicated by the optical splitter 102 is transferred to the optical transmission channel 106. The optical packet transferred to the optical transmission channel 105 is broken off, and also the optical packet transferred to the optical transmission channel 106 is broken off. In the above operation, the optical packet which has gone around the ring type network 100 is broken off in the repeater 1 in the broadcast transmission.

According to the flow of the optical packet described above, the optical packet in the broadcast transmission goes around the ring type network 100 while the same is kept as an optical signal, and is transferred to all the networks connected to all the repeaters provided within the optical communication system 1S. Further, since the optical packet does not require any electric process of a low processing speed, a broadcast transmission of the optical packet can be realized at a high transferring speed without suffering from a transmission delay.

[Multicast]

Using a ring type network as a sample of the communication network, a multicast transmission of the optical packet over an optical packet network will be described with reference to FIGS. 4 to 6.

Figure 4:
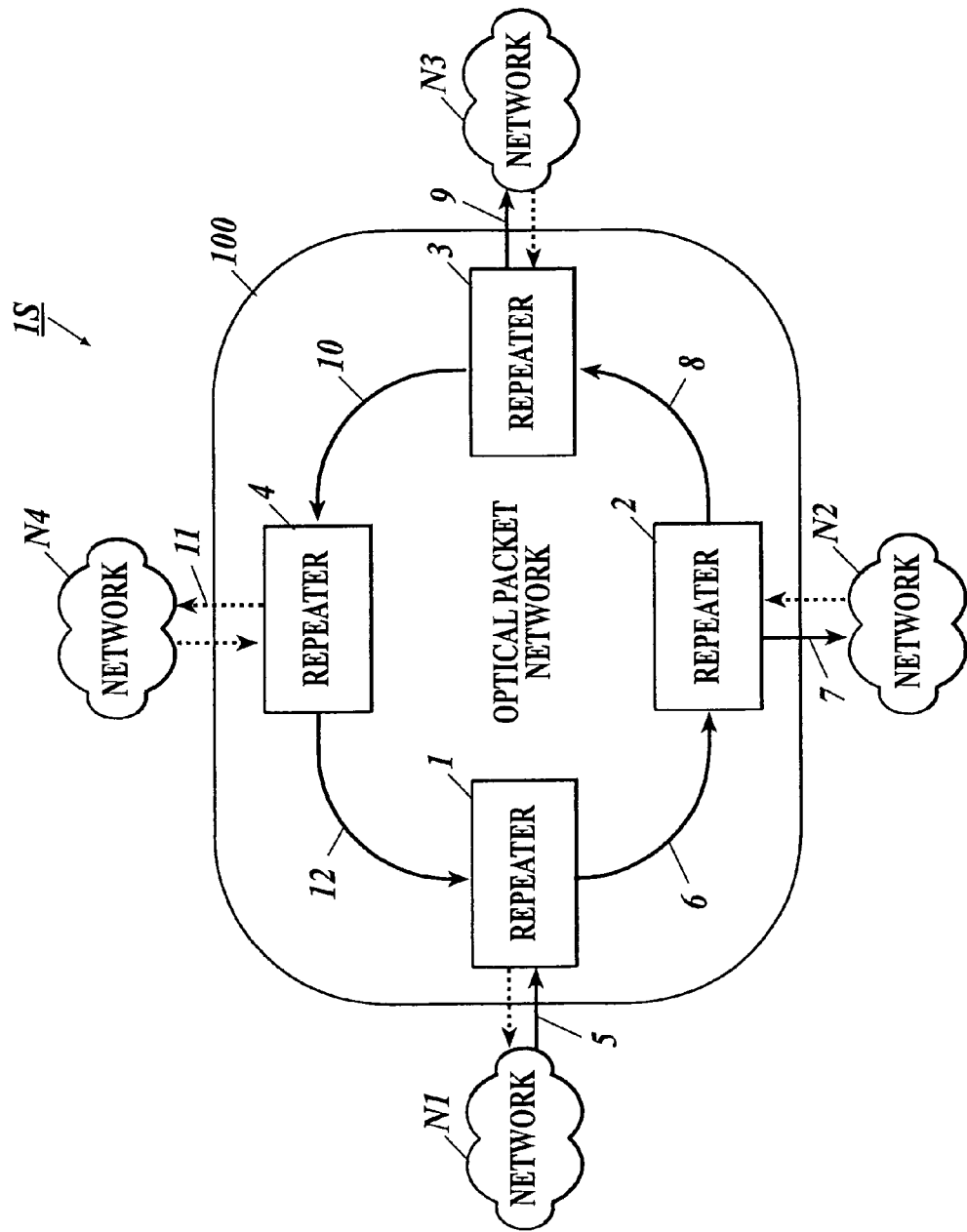
FIG. 4 is a view illustrating a flow of the optical packet in the multicast transmission.

FIG. 4 is a view illustrating by an example a flow of the optical packet (solid arrows in FIG. 4). In FIG. 4, the network N4 is excluded from the designations to which the optical packet is to be transferred. FIG. 5 is a view illustrating a detailed header portion of the optical packet.

Figure 5:
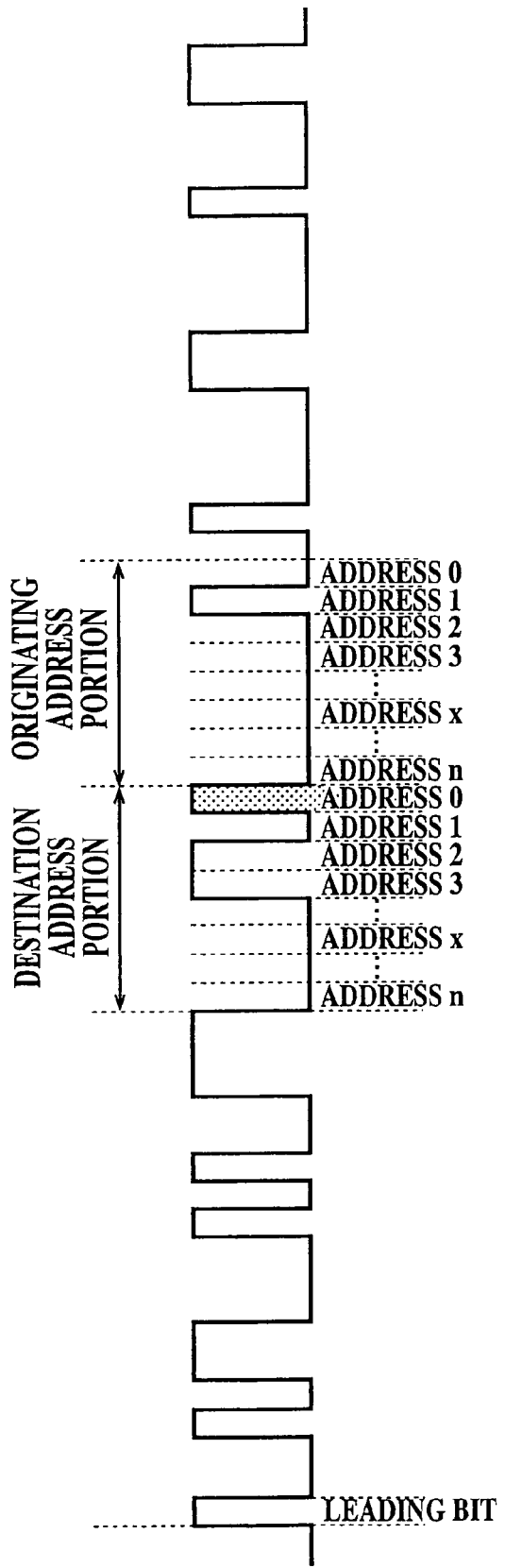
FIG. 5 is a view showing an address configuration of a header portion of the optical packet.

As shown in FIG. 5, in the header portion of the optical packet, there is provided a destination address portion and a source address portion at a position apart by the predetermined number of bits from the leading bit. The destination address portion and source address portion each contain n+1 bits, and the destination address portion is assigned with destination addresses in units of bit, and the source address portion is also assigned with source addresses in units of bit.

In the destination address portion, "address 0" indicates whether or not a plurality of destination addresses are included, and "addresses 1 to n" each indicate a destination address. When a value of the bit of "address 0" takes "1", the multicast transmission or broadcast transmission (a plurality of designations) is indicated, and when a value of the bit of "address 0" takes "0", the unicast transmission (single destination) is indicated. When a value of the bit in "addresses 1 to n" of the destination address portion takes "1", it is indicated that destination address has been appointed, and when the value of the bit takes "0", it is indicated that no designation has been appointed. Further, when a value of any of bits in addresses of the source address portion takes "1", an address whose bit takes "1" indicates the source address.

Assuming that an address 1 indicates the network N1, an address 2 the network N2, an address 3 the network N3, and an address 4 indicates the network N4, FIG. 5 illustrates the optical packet indicating that the multicast transmission of the optical packet is designated with the originating source of the network N1 and the destinations of the networks N2 and N3. With an address configuration of the optical packet shown in FIG. 5, a number of specified addresses can easily be designated in the multicast transmission by setting a value of the bit (address "0") indicating the multicast transmission to "1" and also values of the bits corresponding to the destination addresses to "1". The repeaters are not required to read all the bits in the destination address portion and source address portion, but read only the related bits. Therefore, the optical packet can be transferred at a high processing speed. In the case of the broadcast transmission, it is only required that all the values of the addresses 1 to n in the destination address portion be set to "1".

Now, as an example of the multicast transmission, a transferring process for transferring the optical packet having the header configuration shown in FIG. 5 will be described.

The optical packet generated in the network N1 is transferred to the ring type network 100 through the repeater 1. The optical packet is transferred from the repeater 1 to the repeater 2 through the optical transmission channel 6. The optical packet is duplicated in the repeater 2 and the duplicated optical packets are transferred to the optical transmission channels 7 and 8, respectively. The optical packet transferred to the optical transmission channel 7 reaches the network N2, and meanwhile the optical packet transferred to the optical transmission channel 8 reaches the repeater 3. The optical packet is duplicated in the repeater 3 and the duplicated optical packets are transferred to the optical transmission channels 9 and 10, respectively. The optical packet transferred to the optical transmission channel 9 reaches the network N3, and meanwhile the optical packet transferred to the optical transmission channel 10 reaches the repeater 4.

Since the network N4 is not contained in the destination address portion of the optical packet shown in FIG. 5 (i.e. the value of the bit of the address 4 is set to "0"), the repeater 4 transfers the optical packet to the optical transmission channel 12, but not to the optical transmission channel 11. Therefore, the optical packet on the optical transmission channel 12 does not reach the network N4. The optical packet has gone around the ring type network 100 and returned to the repeater 1 serving as the gate repeater to the ring type network 100. When it is confirmed in the repeater 1 that the source address designates the network N1 connected to the repeater 1 (i.e. the value of the bit in the source address portion is set to "1"), the optical packet returning to the repeater 1 is not transferred to the following repeater anymore, but broken off in the repeater 1.

Figure 6:
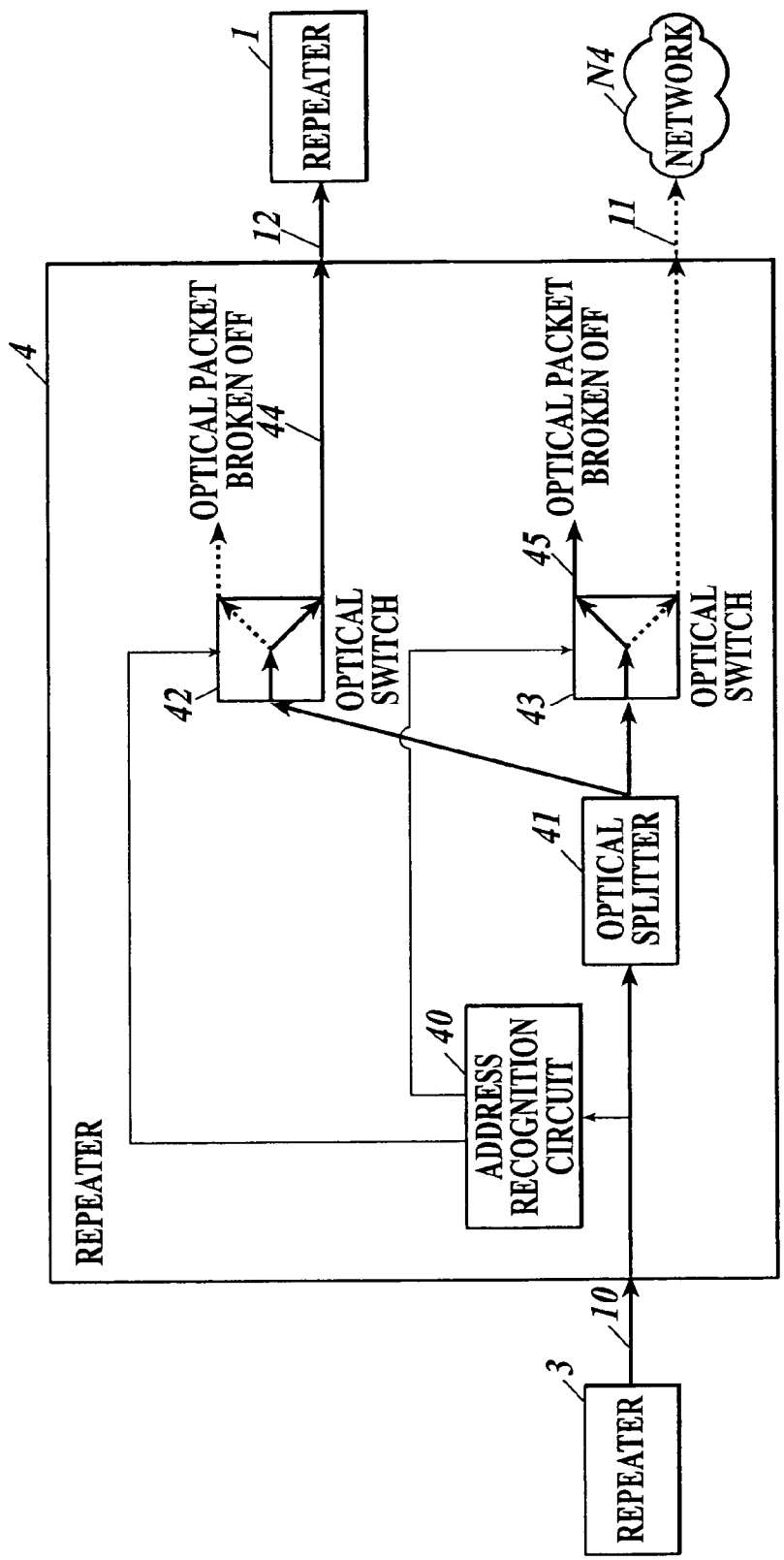
FIG. 6 is a view illustrating a transferring operation for transferring the optical packet from the repeater to the following repeater.

Referring to FIG. 6, a process is described, which is performed in the repeater 4 to transfer to the following repeater 1 the optical packet having the header configuration shown in FIG. 5. In the repeater 4 connected to the network N4 which has not been designated in the destination address portion, the optical packet entered from the optical transmission channel 10 is not transferred to the network N4 but transferred only to the optical transmission channel 12 connected to the following repeater 1.

When the optical packet is entered from the optical transmission channel 10 to the repeater 4, an address recognition circuit 40 recognizes that the network N4 is not included in the destination addresses of the header portion of the optical packet, and generates a control signal based on the recognition result. The control signal is output to optical switches 42 and 43. The optical switch 42 selects an optical transmission channel 44 and the optical switch 43 selects an optical transmission channel 45, on the basis of the control signal form the address recognition circuit 40. Meanwhile, the optical packet entered to the repeater 4 is split into two packets by an optical splitter 41, and the two packets are output to the optical switches 42 and 43, respectively.

In the optical switch 42, the optical packet is transferred to the optical transmission channel 44, and in the optical switch 43, the optical packet is transferred to the optical transmission channel 45. Meanwhile, the optical packet transferred the optical transmission channel 45 is broken off.

As described above, the optical packet entered to the repeater 4 is transferred only to the repeater 1 without being subjected to Optical/Electric conversion, but not to the network N4 connected to the repeater 4.

According to the flow of the optical packet described above, the optical packet in the multicast transmission goes around the ring type network 100 while the same is kept as an optical signal, and is transferred only to the network designated in the destination address portion. Further, since the optical packet does not require any electric process of a low processing speed in the multicast transmission, the broadcast transmission of the optical packet can be performed at a high processing speed without suffering from a transmission delay.

In the repeaters and optical communication system according to the embodiments of the invention, destination addresses are recognized in the optical packet having a simple address configuration, and the optical packets split by the optical splitter are transferred to the optical transmission channels corresponding respectively to the recognized destination addresses. In the above manner, the broadcast transmission and multicast transmission of a high processing speed are realized without using conventional electronic processes in the repeaters to electrically process the packet.

More specifically, a processing delay in the repeaters in which the optical packet does not require Optical/Electric conversion or a processing delay in the repeaters in which the optical packet is subjected only to essential electronic processes, is caused only during optical transmission of the optical packet in such repeaters. Therefore, the transmission delay is greatly reduced compared with the conventional repeater in which the optical packet is subjected to Optical/Electric conversion. Since the transmission delay per repeater is reduced, even though a plurality of repeaters are used, the total transmission delay over the whole optical communication system is greatly decreased.

Further, the repeaters according to the invention does not require such a large scale electronic circuit as employed in the conventional repeaters, in which the optical packet is subjected to Optical/Electric conversion. The address configuration of the optical packet for indicating the broadcast transmission or multicast transmission is made simpler, and therefore a circuit scale of the address recognition circuit can be reduced, and the operation speed of the circuit can be increased, too.

[Duplex Ring Type Network]

Figure 7:
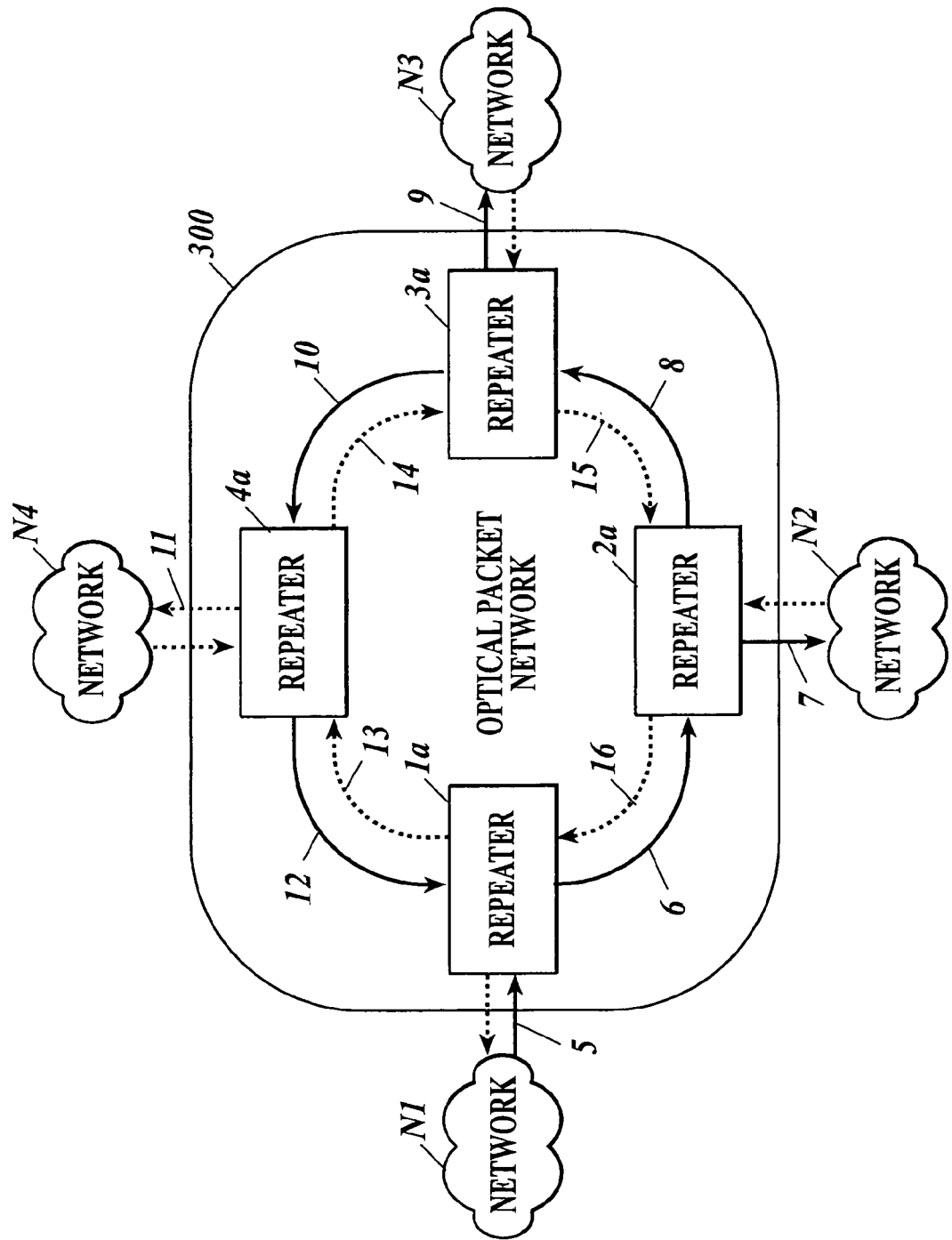
FIG. 7 is a view showing a duplex ring type network.

Now, a duplex ring type network 300 will be described with reference to FIGS. 7 to 9.

In FIGS. 1 and 4 is shown a single ring type network having the optical transmission channels 6, 8, 10 and 12. To enhance redundancy of the ring type network, the ring type network can be made to a duplex type network, by connecting an additional transmission channel including optical transmission channels 13, 14, 15 and 16, as shown in FIG. 7.

Figure 8:
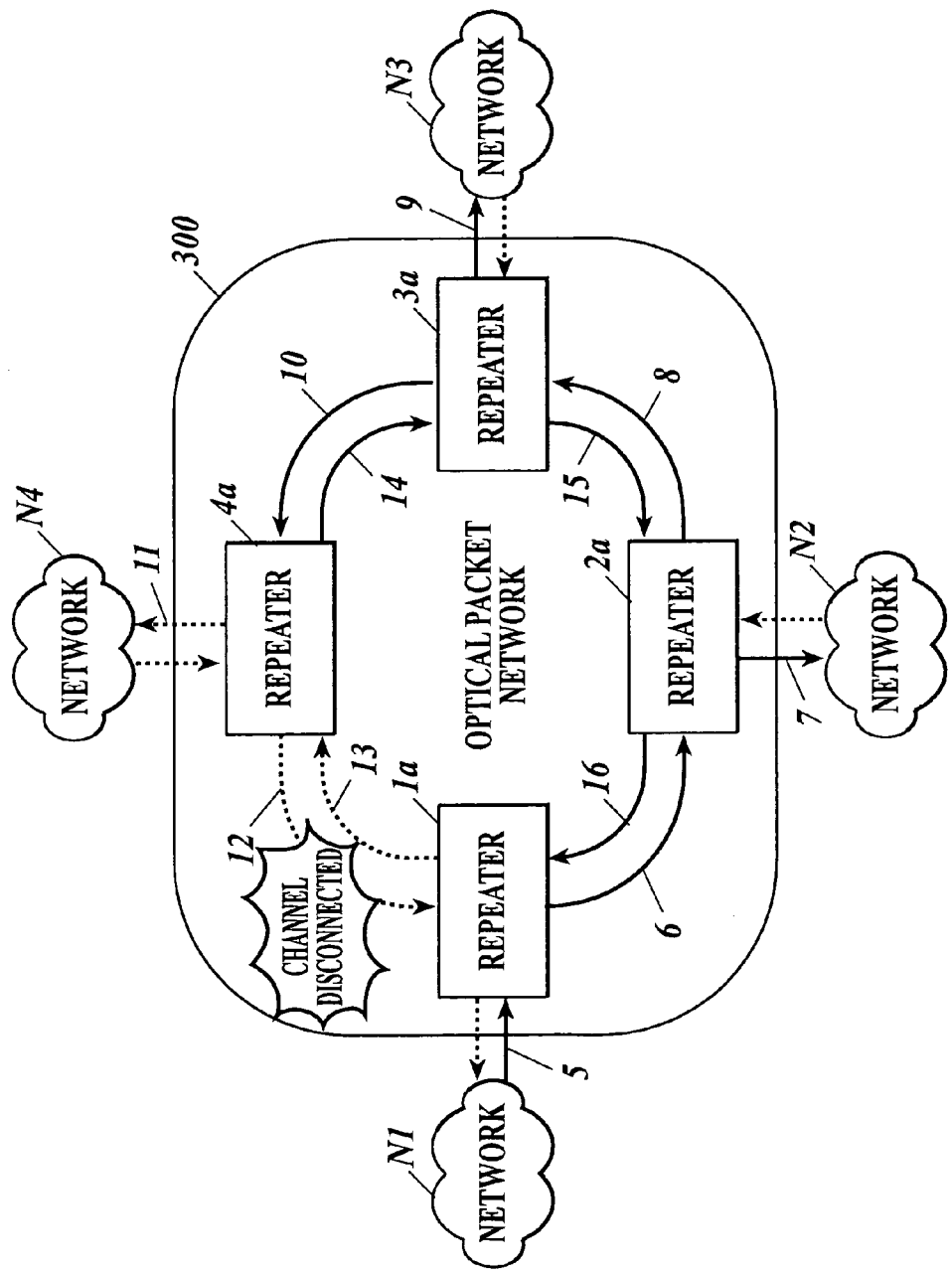
FIG. 8 is a view illustrating the duplex ring type network with a disconnection failure occurring in the optical transmission channel.

Hereafter, a process for transferring an optical packet will be described, which process is performed when the optical transmission channel 12 has come down in the ring type network 300 as shown in FIG. 8. When a disconnection fault should occur in the optical transmission channel 12 in the ring type network 100 as shown in FIG. 1, the optical transmission channel is broken down, and communication is interrupted over a portion of the transmission channel where no accidental failure occurs. In the duplex ring type network 300, when the optical transmission channel 12 should be broken down and/or some repeater should fail to operate properly, only such portion in trouble can be removed from the transmission channel to allow to a communication over portions operating properly.

In the case that the optical transmission channel 12 should break down, such optical transmission channel 12 is removed from the optical transmission channel, and the optical transmission channels 14, 15 and 16 are used to establish a ring type network having a new transmission channel including a repeater 1*a*, optical transmission channel 6, repeater 2*a*, optical transmission channel 8, repeater 3*a*, optical transmission channel 10, repeater 4*a*, optical transmission channel 14, repeater 3*a*, optical transmission channel 15, repeater 2*a*, optical transmission channel 16, and repeater 1*a*. With use of the new ring type network, the optical transmission channel in trouble is removed, and the optical transmission channels and repeaters operating properly can be connected.

Figure 9:
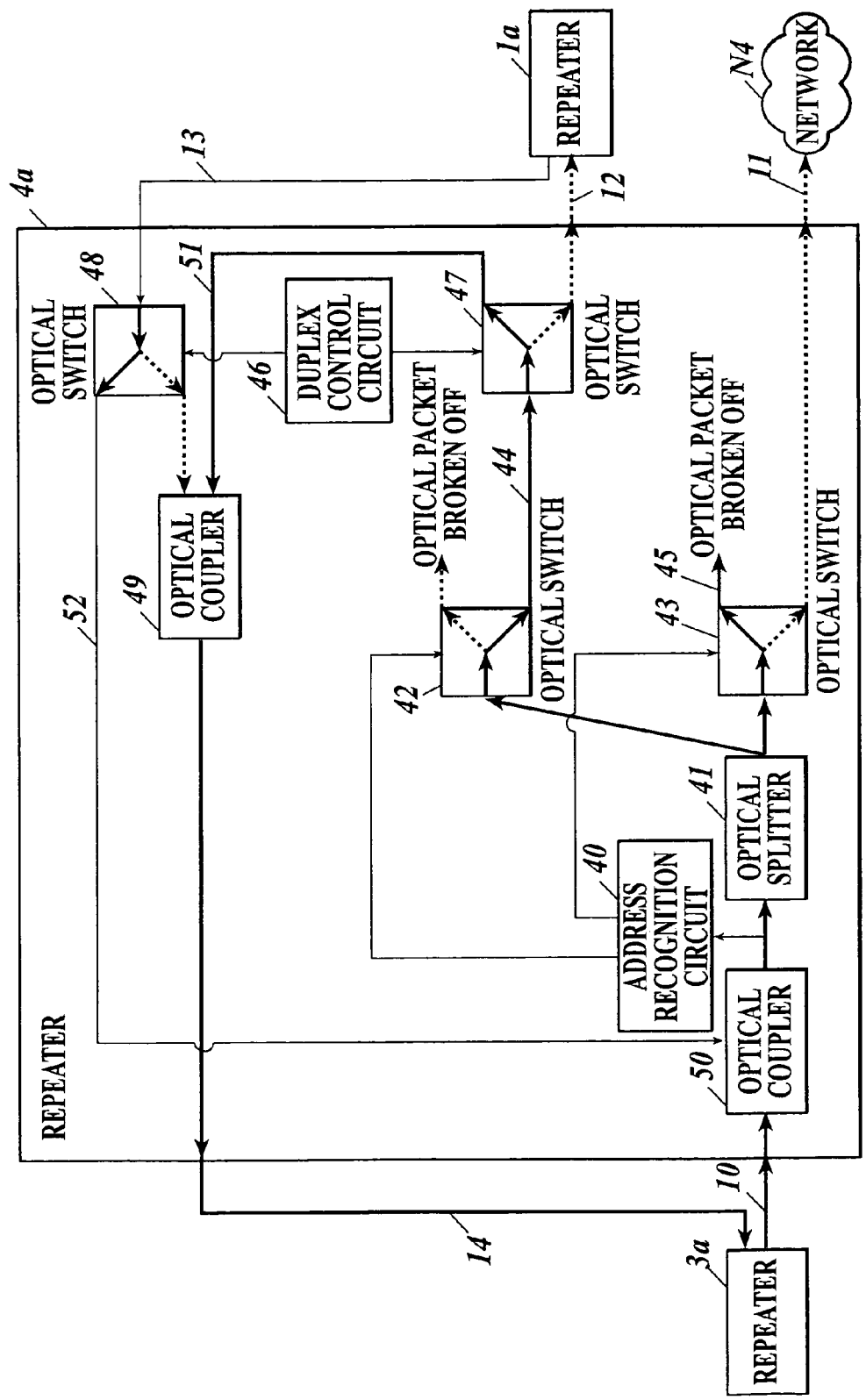
FIG. 9 is a view showing an operation performed in the repeater when a disconnection failure occurs in the optical transmission channel.
Figure 10:
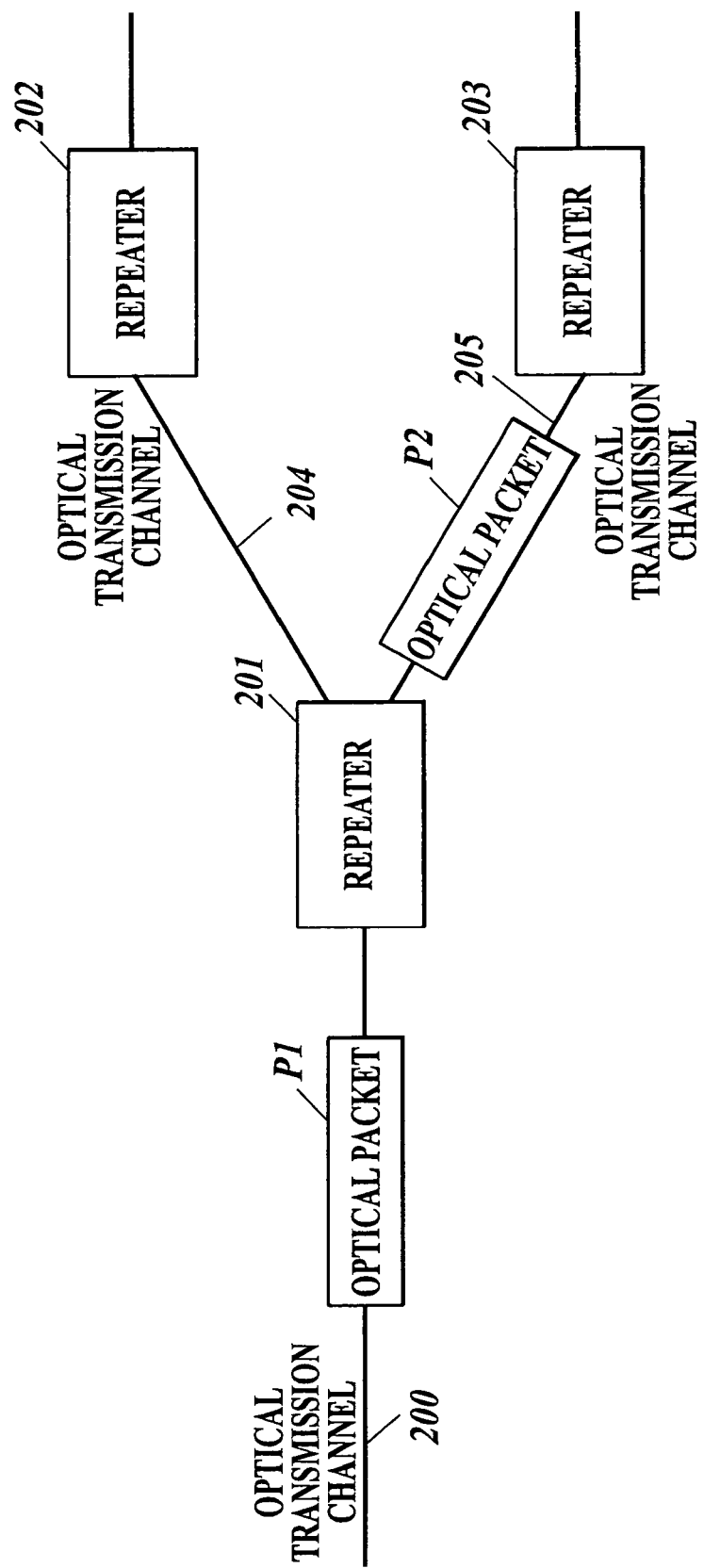
FIG. 10 is a view illustrating a switching operation of an optical packet through the repeaters in a conventional optical communication system.
Figure 11:
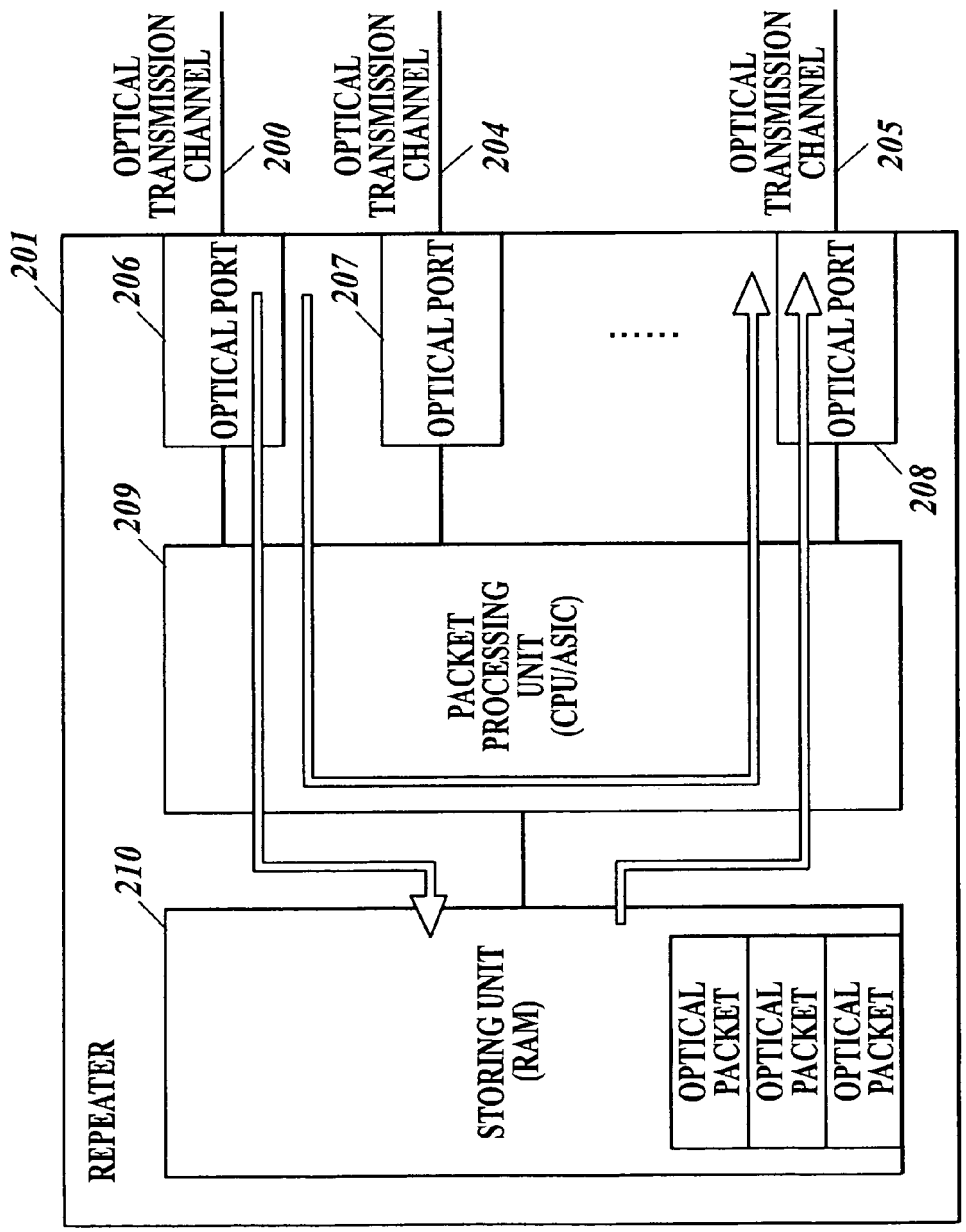
FIG. 11 is a view showing an interior configuration of the conventional repeater and an operation performed in the repeater.
Figure 12:
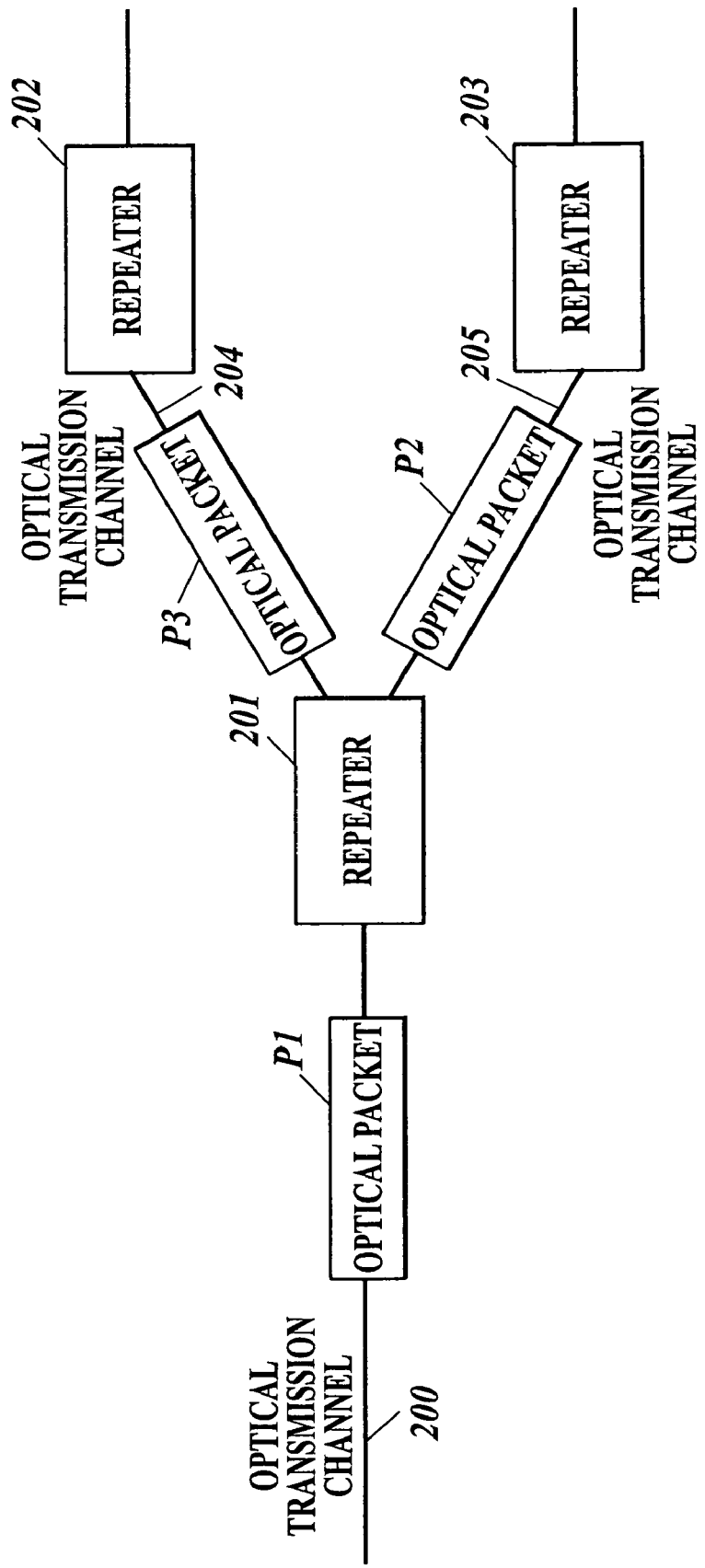
FIG. 12 is a view illustrating the broadcast transmission or multicast transmission of the optical packet by the repeater in the conventional communication system.
Figure 13:
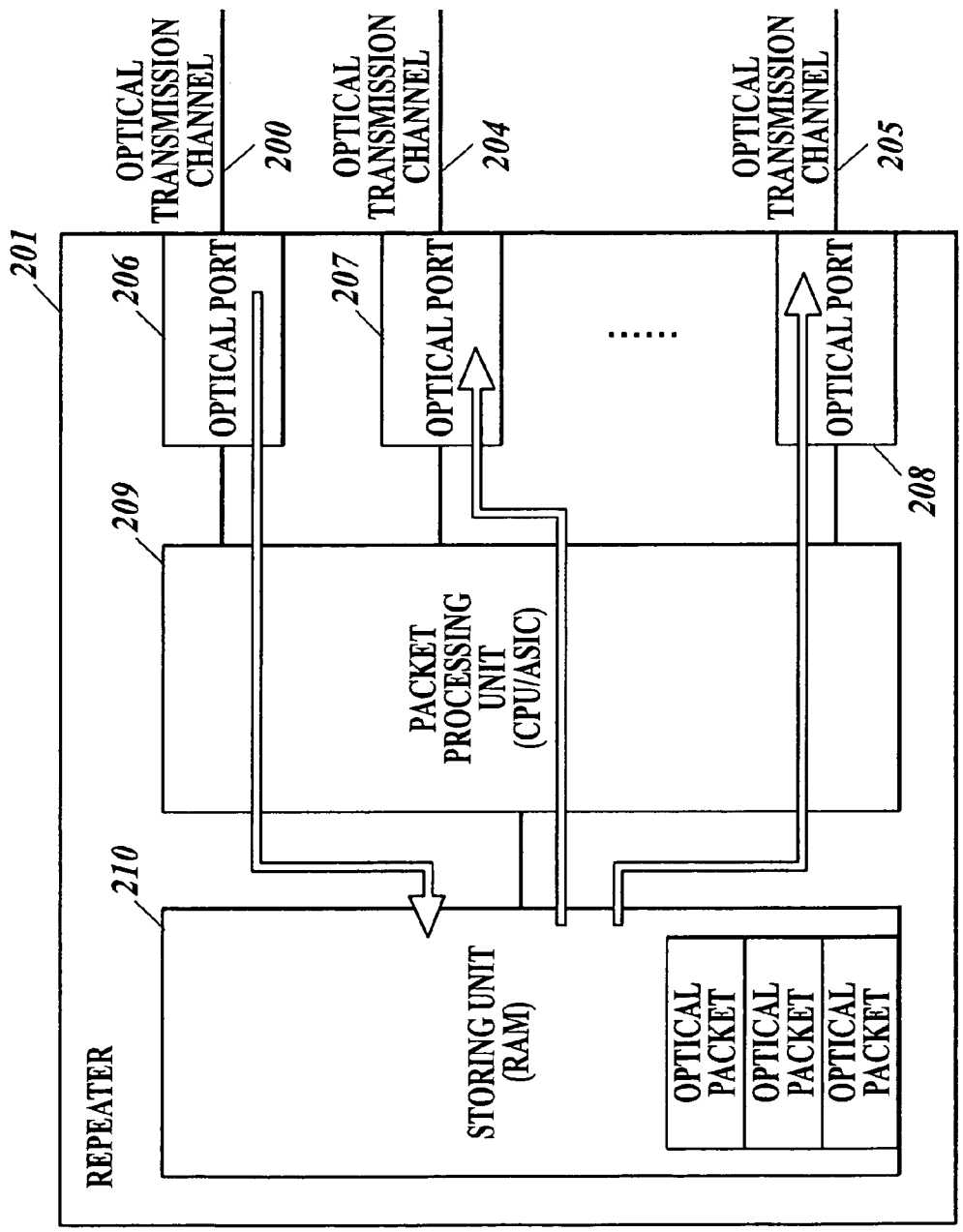
FIG. 13 is a view illustrating an operation performed by the conventional repeater in the broadcast transmission and multicast transmission.

FIG. 9 is a view illustrating an interior configuration of repeater 4*a*, as one example of the repeaters involved in the ring type network 300. In FIG. 9, like components as those in the repeater 4 (in the ring type network 100) in FIG. 6 are designated by like reference numerals, and their description will be omitted.

A duplex control circuit 46 generates a control signal depending on a transmission state of the optical transmission channel connected to the repeater 4*a*, and outputs the control signal to optical switches 47 and 48. More specifically, detecting a disconnection of the optical transmission channel 12, the duplex control circuit 46 outputs the control signal to the optical switch 47, instructing to select a turning transmission channel for the optical packet.

As a method for detecting a disconnection fault of an optical transmission channel and/or a failure of a repeater, it is considered to send an optical packet for testing to the optical transmission channel and watch an arrival of such optical packet to find out any trouble in the network. Further, it is possible to detect a disconnection of the optical transmission channel and/or a failure of the repeater, by watching an operating state of the ring type network 300 from a separate network, which is prepare for a managing purpose in addition to the ring type network 300.

In accordance with the control signal from the duplex control circuit 46, the optical switch 47 selects a transmission channel for the optical packet transferred from the optical transmission channel 44. Meanwhile, in accordance with the control signal from the duplex control circuit 46, the optical switch 48 selects a transmission channel for the optical packet transferred from the optical transmission channel 13.

An optical coupler 49 couples the optical packet transferred from the optical switch 47 through the optical transmission channel 51 with the optical packet entered from the optical switch 48, and transfers the coupled packet to the optical transmission channel 14. An optical coupler 50 couples the optical packet transferred from the repeater 3*a* through the optical transmission channel 10 with the optical packet entered from the optical switch 48 through the optical transmission channel 52, and outputs the coupled packet to the address recognition circuit 40 and optical splitter 41.

In the case where a disconnection fault occurs in the optical transmission channel 12, the duplex control circuit 46 outputs a control signal to the optical switch 47, instructing to select a turning transmission channel for the optical packet. The optical switch 47 selects the optical transmission channel 51, and transfers the optical packet to the optical transmission channel 51. With the above operation, the optical packet transferred to the repeater 4*a* through the optical transmission channel 10 is turned in the repeater 4*a* and transferred to the repeater 3*a* through the optical transmission channel 14.

As described above, in the case of a disconnection fault in an optical transmission channel and/or a failure of a repeater in the duplex ring type network 300, a transmission channel for the optical packet is secured with the transmission channel operating properly, which allows the optical packet to be transferred without failure.

All the disclosure of Japanese Patent Application No. 2005-248945, filed Aug. 30, 2005, including the specification, claims, drawings and abstract, is incorporated into a part of the present patent, application.

What is claimed is:

1. A repeater comprising:
a recognizing unit to recognize one or more destination addresses of an optical packet from the optical packet which includes the one destination address assigned in a bit or a plurality of destination addresses assigned in a plurality of bits respectively and a bit indicating whether or not the plurality of destination addresses are assigned;
an optical splitting unit to split the optical packet into a plurality of optical packets; and
selecting units to select transmission channels for the split optical packets on the basis of recognition results by the recognizing units, respectively.

2. The repeater as claimed in claim 1, wherein a plurality of specified addresses can be designated for each of the optical packets split by including a combination of bits each indicating a destination address and a bit indicating that a plurality of destination addresses are assigned.

3. An optical communication system comprising:
a repeater provided in a predetermined network, for transferring an optical packet,
wherein the repeater comprises:
a recognizing unit configured to recognize one or more destination addresses of an optical packet from the optical packet, which includes the one destination address assigned in a bit or plurality of destination addresses assigned in a plurality of bits respectively and a bit indicating whether or not the plurality of destination addresses are assigned;
an optical splitting unit configured to split the optical packet into a plurality of optical packets; and
selecting units configured to select transmission channels for the split plurality of optical packets on the basis of recognition results by the recognizing units, respectively.

4. The optical communication system as claimed in claim 3, wherein a plurality of specified addresses can be designated for each of the plurality of optical packets split by including a combination of bits each indicating a destination address and a bit indicating that a plurality of destination addresses are assigned.

5. The optical communication system as claimed in claim 3, wherein the repeater is provided in a ring type network.

6. The optical communication system as claimed in claim 4, wherein the repeater is provided in a ring type network.

* * * * *